(12) United States Patent
Drazic

(10) Patent No.: US 6,775,061 B2
(45) Date of Patent: Aug. 10, 2004

(54) REFLECTING LIGHT POLARIZER MADE OF COATED NON-LINEAR SURFACES

(75) Inventor: Valter Drazic, Betton (FR)

(73) Assignee: Thomson Licensing S. A., Boulogne-Billancourt (FR)

(*) Notice: Subject to any disclaimer, the term of this patent is extended or adjusted under 35 U.S.C. 154(b) by 0 days.

(21) Appl. No.: 10/150,348

(22) Filed: May 17, 2002

(65) Prior Publication Data
US 2003/0214716 A1 Nov. 20, 2003

(51) Int. Cl.⁷ ................ G02B 5/30; B32B 3/00; B32B 17/00; B32B 31/06; C03C 27/00
(52) U.S. Cl. ............ 359/487; 359/485; 359/900; 156/99; 156/101
(58) Field of Search ................. 359/483, 485, 359/487, 900; 156/99, 101, 106, 107

(56) References Cited

U.S. PATENT DOCUMENTS

| | | | |
|---|---|---|---|
| 5,061,050 A | 10/1991 | Ogura | 359/490 |
| 5,387,953 A * | 2/1995 | Minoura et al. | 353/20 |
| 5,394,253 A * | 2/1995 | Kelly | 359/15 |
| 5,559,634 A * | 9/1996 | Weber | 359/638 |
| 5,825,022 A | 10/1998 | Takekoshi et al. | 250/225 |
| 5,900,977 A * | 5/1999 | Hikmet | 359/497 |
| 6,436,214 B1 * | 8/2002 | Murata | 156/99 |

FOREIGN PATENT DOCUMENTS

| | | | |
|---|---|---|---|
| EP | 0 359 658 A2 * | 3/1990 | |
| EP | 1081964 A2 | 3/2001 | H04N/9/31 |
| JP | 04355702 | 9/1992 | |
| JP | 04355702 | 12/1992 | G02B/5/30 |
| JP | 10-227913 a * | 8/1998 | |
| JP | 10227913 | 8/1998 | G02B/5/30 |
| JP | 2000-221324 A * | 8/2000 | |

* cited by examiner

Primary Examiner—John Juba, Jr.
(74) Attorney, Agent, or Firm—Joseph S. Tripoli; Joseph J. Laks; Richard LaPeruta, Jr.

(57) ABSTRACT

A reflecting light polarizer having improved polarizing efficiency, and a method of manufacturing the reflecting light polarizer. The reflecting light poplarizer includes a first non-linear mating surface, a second non-linear mating surface and a polarizing coating disposed between the first and second non-linear mating surfaces wherein a first light polarization is transmitted through the reflecting light polarizer and a second light polarization is reflected by the reflecting light polarizer. The reflecting light polarizer can further include glue disposed between the first non-linear mating surface and the second non-linear mating surface. The reflecting light polarizer also can include at least one clamping device securing together the first non-linear mating surface and the second non-linear mating surface. The first and second non-linear mating surfaces can be glass, plastic or crystalline.

24 Claims, 6 Drawing Sheets

REFLECTING LIGHT POLARIZER MADE OF COATED NON-LINEAR SURFACES

CROSS REFERENCE TO RELATED APPLICATIONS

Not Applicable

BACKGROUND OF THE INVENTION

1. Field of the Invention

This invention relates to the field of light polarizers, and more particularly, to a reflecting light polarizer that passes light waves of a specific polarity while reflecting others.

2. Description of Related Art

There are two types of light polarizers typically used for providing polarized light. The first type of light polarizer is an absorbing light polarizer, which passes a portion of light having a specific polarization while absorbing the remaining light. The energy of the absorbed light is generally converted into heat energy. In systems requiring high light concentration, such as in liquid crystal display (LCD) and liquid crystal on silicon (LCOS) illumination systems, the heat load generated in each absorbing light polarizer can be greater than the than the amount of heat the light polarizers can efficiently dissipate. Thus, typical absorbing light polarizers are susceptible to damage caused by overheating when they are used in LCD or LCOS illumination systems. Furthermore, the light energy converted into heat energy becomes unusable for the intended purpose of providing illumination, and is thus wasted. Hence, absorbing light polarizers are not well suited for use in LCD and LCOS illumination systems.

A reflecting light polarizer is a type of light polarizer that passes a specific light polarity while reflecting the remaining light. One example of a reflecting light polarizer is a polarizing cube beamsplitter, which divides unpolarized light into P and S polarizations. However, a cube beamsplitter is expensive and bulky, and thus is not practical for use in small imager applications where price, available space and weight are issues.

Another example of a reflecting light polarizer is disclosed in U.S. Pat. No. 6,122,103 to Perkins et al. entitled Broadband Wire Grid Polarizer for the Visible Spectrum (hereinafter "Perkins"). Perkins discloses a broadband wire grid polarizer for the visible spectrum that has a plurality of elongated elements supported on a substrate. Ribs formed by etching slots extend from a substrate and support the elements, which are relatively long and thin. The dimensions of the elements are critical, and thus the manufacturing process for the broadband wire grid polarizer can be complicated. Accordingly, broadband wire grid polarizers are relatively expensive. Hence, what is needed is a reflecting light polarizer that has reduced heat loss and improved light energy efficiency in comparison to absorbing light polarizers, yet is small, light, and inexpensive to manufacture.

SUMMARY

The present invention is a reflecting light polarizer having improved polarizing efficiency, and a method of manufacturing the reflecting light polarizer. The reflecting light poplarizer includes a first non-linear mating surface, a second non-linear mating surface and a polarizing coating disposed between the first nonlinear mating surface and the second non-linear mating surface wherein a first light polarization is transmitted through the reflecting light polarizer and a second light polarization is reflected by the reflecting light polarizer. It should be understood within the context of this application that "non-linear" refers to a surface that is not flat or that is jagged such as a saw tooth structure. The reflecting light polarizer can further include glue disposed between the first non-linear mating surface and the second non-linear mating surface. The reflecting light polarizer also can include at least one clamping device securing together the first non-linear mating surface and the second non-linear mating surface. Further, the first and second mating surfaces can have substantially continuous contact with the polarizing coating disposed between the first and second mating surfaces. The first and second non-linear mating surfaces can include at least one planar segment and the cross section of at least one of the first and second non-linear mating surfaces can be saw tooth shaped. The first and second non-linear mating surfaces can be glass, plastic or crystalline.

In another embodiment, the reflecting light polarizer can include a first mating surface which includes a plurality of first planar segments and a plurality of second planar segments, the second planar segments being interposed between adjacent ones of the first planar segments, a second mating surface which includes a plurality of third planar segments and a plurality of fourth planar segments, the fourth planar segments being interposed between adjacent ones of the third planar segments, a polarizing coating disposed between the first planar segments and the third planar segments, and a mirror coating disposed between the second planar segments and the fourth planar segments.

A method of manufacturing a reflecting light polarizer can include the steps of (a) depositing a first polarizing coating on at least one mating surface of a plurality of plates, (b) securing together the plurality of plates with the first polarizing coating disposed between the mating surfaces of adjacent plates, (c) cutting the secured plurality of plates along at least one first cross section to form a plurality of plate sections, each of the plate sections having at least one cross sectional surface, (d) applying a second polarizing coating to a plurality of the cross sectional surfaces, (e) securing together the plurality of plate sections, wherein the cross sectional surfaces of adjacent plate sections are mated together and the polarizing coating is disposed between the cross sectional surfaces being mated, and (f) cutting the plurality of plate sections along at least one second cross section.

The first cross section is substantially perpendicular to the at least one mating surface and the second cross section can be disposed approximately 45 degrees with reference to the first cross section. Further, the first polarizing coating and the second polarizing coating can be a common polarizing material. The plurality of plates can be secured together with glue. The plurality of plates also can be secured together with a clamping device.

Another method manufacturing a reflecting light polarizer can include the steps of (a) molding or extruding a first plate having a first mating surface, (b) molding or extruding a second plate having a second mating surface, (c) depositing a polarizing coating to at least one of the first mating surface and the second mating surface and (d) securing the first mating surface to the second mating surface. Glue can be disposed between the first mating surface and the second mating surface. At least one clamping device can secure together the first mating surface and the second mating surface.

DETAILED DESCRIPTION

Figure 1:
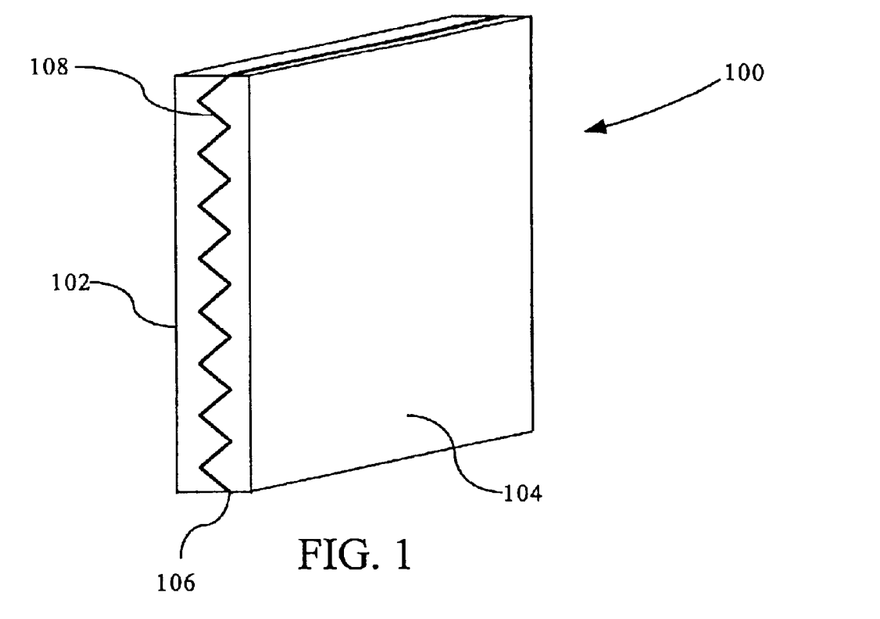
FIG. 1A is a perspective view of a reflecting light polarizer in accordance with the present invention.

Referring to FIG. 1, a reflecting light polarizer 100 is shown. The reflecting light polarizer 100 can include a first side member 102 and a second side member 104. The first and second side members 102, 104 can be molded, extruded or carved from light transparent material, for example glass, plastic or crystal. The first and second side members 102,104 can be secured together with a mating junction 106 defined therebetween. A polarizing coating 108 can be disposed between the first side member 102 and the second side member 104 within the mating junction 106. Polarizing coatings are well known to those skilled in the art. One such coating is a PBS-10 Polarizing Beam Splitter available from J. L. Wood Optical Systems, 1361 East Edinger Avenue, Santa Ana Calif. 92705. Polarizing coatings are also available from Edmund Industrial Optics, 101 East Gloucester Pike, Barrington, N.J. 08007. However, the invention is not limited in this regard and other polarizing coatings can be used.

Figure 2:
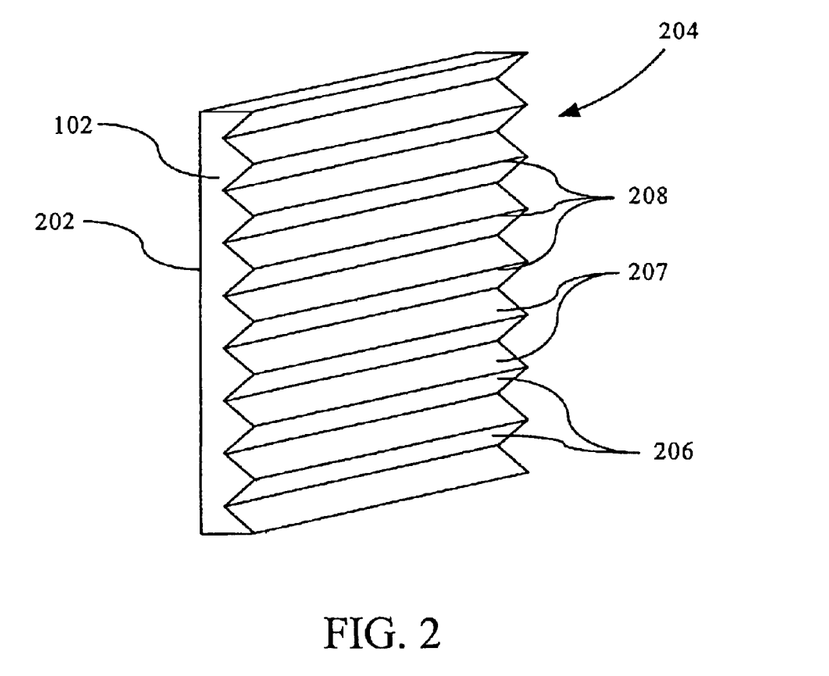
FIG. 2 is a perspective view illustrating the mating surface of plate for a reflecting light polarizer in accordance with the present invention.

FIG. 2 shows a perspective view of the first side member 102. The first side member 102 can include a first planar surface 202 and a first non-linear mating surface 204. The first non-linear mating surface 204 can be formed by a plurality of adjacent planar segments. For example, there can be a plurality of parallel first planar segments 206 and a plurality of parallel second planar segments 207. The first and second planar segments 206, 207 can have a rectangular shape including two long edges that are parallel and two short edges that are parallel. The second planar segments 207 can be interposed between the first planar segments 206. Adjacent ones of planar segments 206, 207 can be joined at their long edges to form angled joints 208, giving the first side member 102 a saw tooth cross-section. In one embodiment the angled joints 208 can be 90 degrees. However, other angles can be used for the angled joints.

Figure 3A:
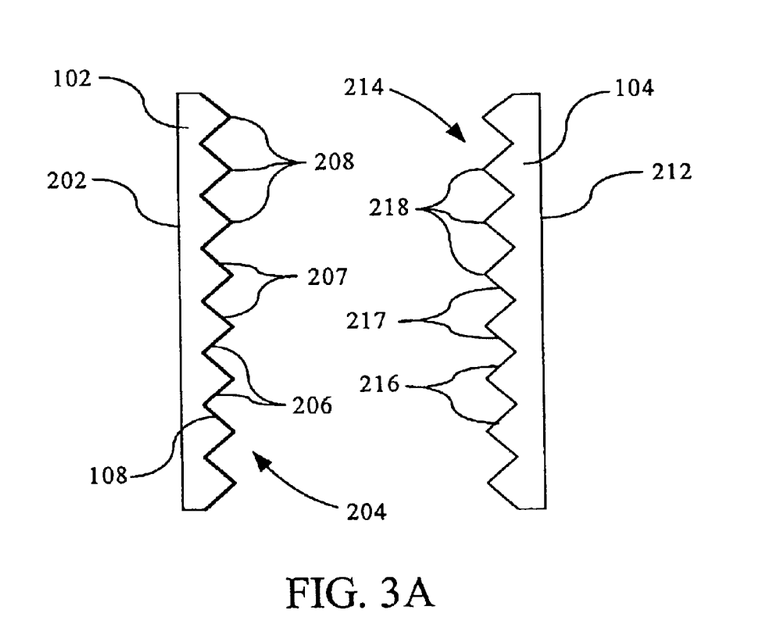
FIG. 3A is a side view illustrating the relative positioning of the mating surfaces of two plates for a reflecting light polarizer prior to being secured together in accordance with the present invention.

Referring to FIG. 3A, the second side member 104 can be constructed similar to the first side member 102, having a second planar surface 212 and a second non-linear mating surface 214. The second non-linear mating surface 214 can be formed by a plurality of interposed third planar segments 216 and forth planar segments 217 that are congruent to first and second planar segments 206, 207, respectively. The second non-linear surface can have angled joints between planar segments 216,217 that are congruent with the first side member's angled joints 208. Accordingly, the first non-linear mating surface 204 and the second non-linear mating surface 214 can form mating surfaces.

The polarizing coating 108 can be disposed between the first non-linear mating surface 204 and the second non-linear mating surface 214. In one embodiment, the polarizing coating 108 can be deposited on either of the first nonlinear mating surface 204 or the second non-linear mating surface 214. In an alternate embodiment the polarizing coating 108 can be deposited on both the first and second non-linear mating surfaces 204, 214.

Figure 3B:
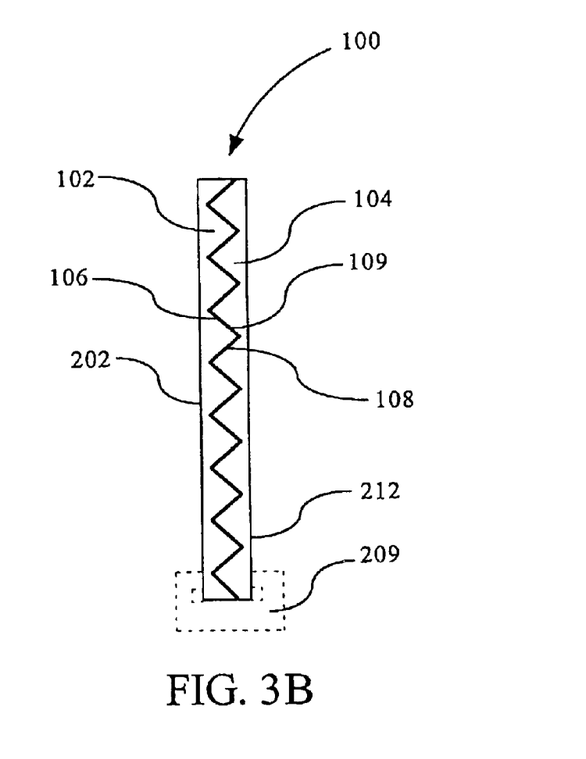
FIG. 3B is a side view illustrating two plates for a reflecting light polarizer after being secured together in accordance with the present invention.

After the polarizing coating is deposited on one or both of the non-linear mating surfaces, 204, 214, the first side member 102 and the second side member 104 can be mated together, as shown in FIG. 3B. In the preferred embodiment, the first non-linear mating surface 204 and the second non-linear mating surface 214 are mated so that voids and gas pockets are minimized or eliminated. In one embodiment, glue can be applied to one of the non-linear surfaces to secure the side members together. The glue can be an optically transparent glue. Further, the glue can be ultra-violate light curable so that the glue cures when ultra-violate light is shined on it. One suitable glue is Norland Optical Adhesive and another is Summers Laboratories UV Curing Lens Bond. Both glues are available from Edmund Industrial Optics, 101 East Gloucester Pike, Barrington, N.J. 08007. In an alternate embodiment, the first side member 102 and the second side member 104 can be secured together by a clamping device. For example, one or more c-channels having spring tension can clamp the side members together along their outer edges.

Figure 4A:
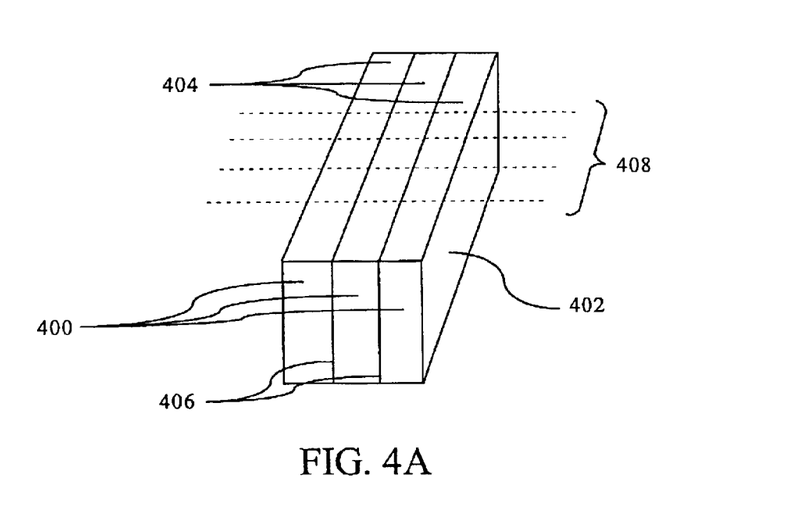
FIGS. 4A–4D are an illustration of steps for manufacturing a reflecting light polarizer in accordance with the present invention.
Figure 4B:
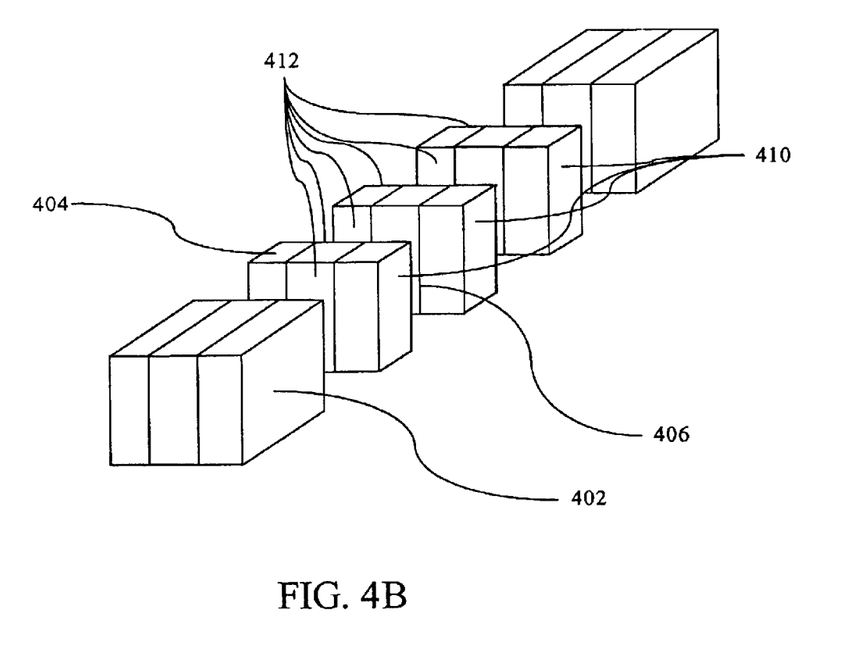

FIGS. 4A–4D illustrate steps for an alternate method for manufacturing a reflecting light polarizer 100. Referring to step 4A, glass plates 400 having planar surfaces 402 and edges 404 can be stacked by gluing together the planar surfaces 402 with a polarizing coating disposed between layers to form first polarizing junctions 406. Typically, the number of glass plates 400 required to manufacture the beam splitter 100 per this technique is proportional to the required width of beam splitter 100. The glass plates then can be cut perpendicular to the planar surfaces 402 and edges 404 along first cross sections 408 to create a plurality of glass plate sections 410 having cross-sectional surfaces 412, as shown in FIG. 4B. As defined herein, substantially perpendicular includes a perpendicular angle and those angles that are nearly perpendicular. The first cuts can be spaced apart a distance approximately equal to the thickness of the glass plates 400.

Figure 4C:
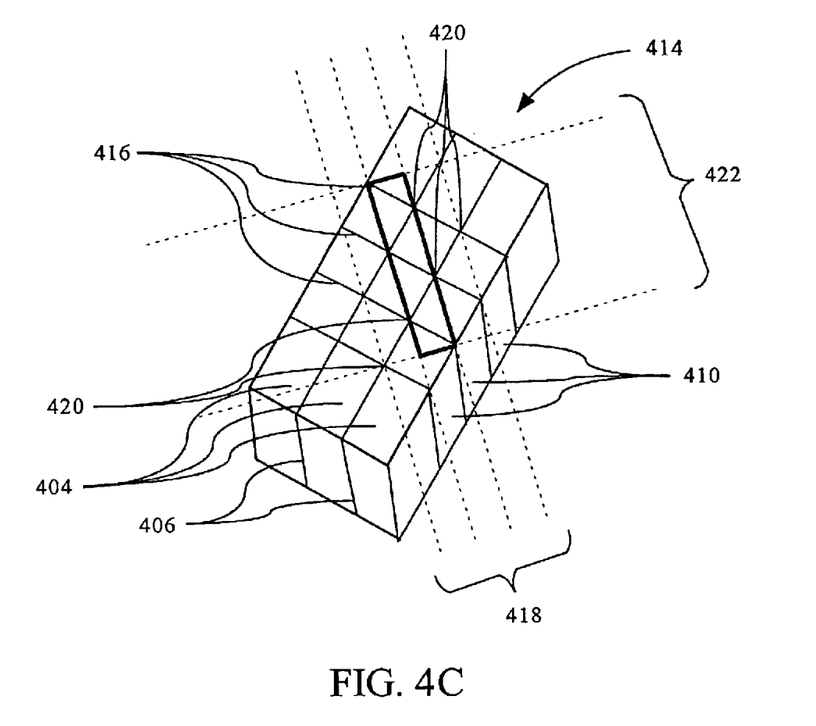

Polarizing coating 108 then can be applied between cross sectional surfaces 412 of adjacent glass plate sections 410. For example, the polarizing coating 108 can be applied to one or both adjacent cross sectional surfaces 412. The glass plate sections 410 then can be glued back together along the same cross-sections 408 to form glass block 414 having second polarizing junctions 416 as shown in FIG. 4C.

Figure 4D:
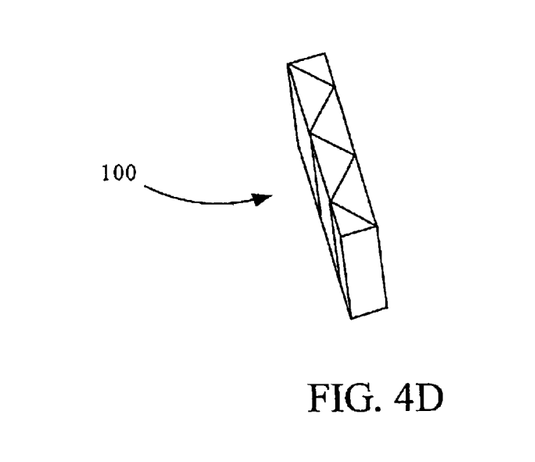

A plurality of second cuts then can be performed on the glass block 414 along second section lines 418 and perpendicular to the edges 404 of the glass plates 400. The second section lines 418 can have an angle of approximately 45 degrees relative to the first cross sections 408 and can intersect the joints 420 where the first polarizing junctions 406 intersect the second polarizing junctions 416. The second cuts can be equally spaced apart. Third cuts then can be performed along third section lines 422 and perpendicular to the edges 404 of the glass plates 400. The third section lines 422 also can be substantially perpendicular to the second section lines 418. The spacing of the third section lines 422 can vary, depending on the width of the beam splitter required. The beam splitter 100 resulting from the alternative manufacturing technique is shown in FIG. 4D.

Figure 5:
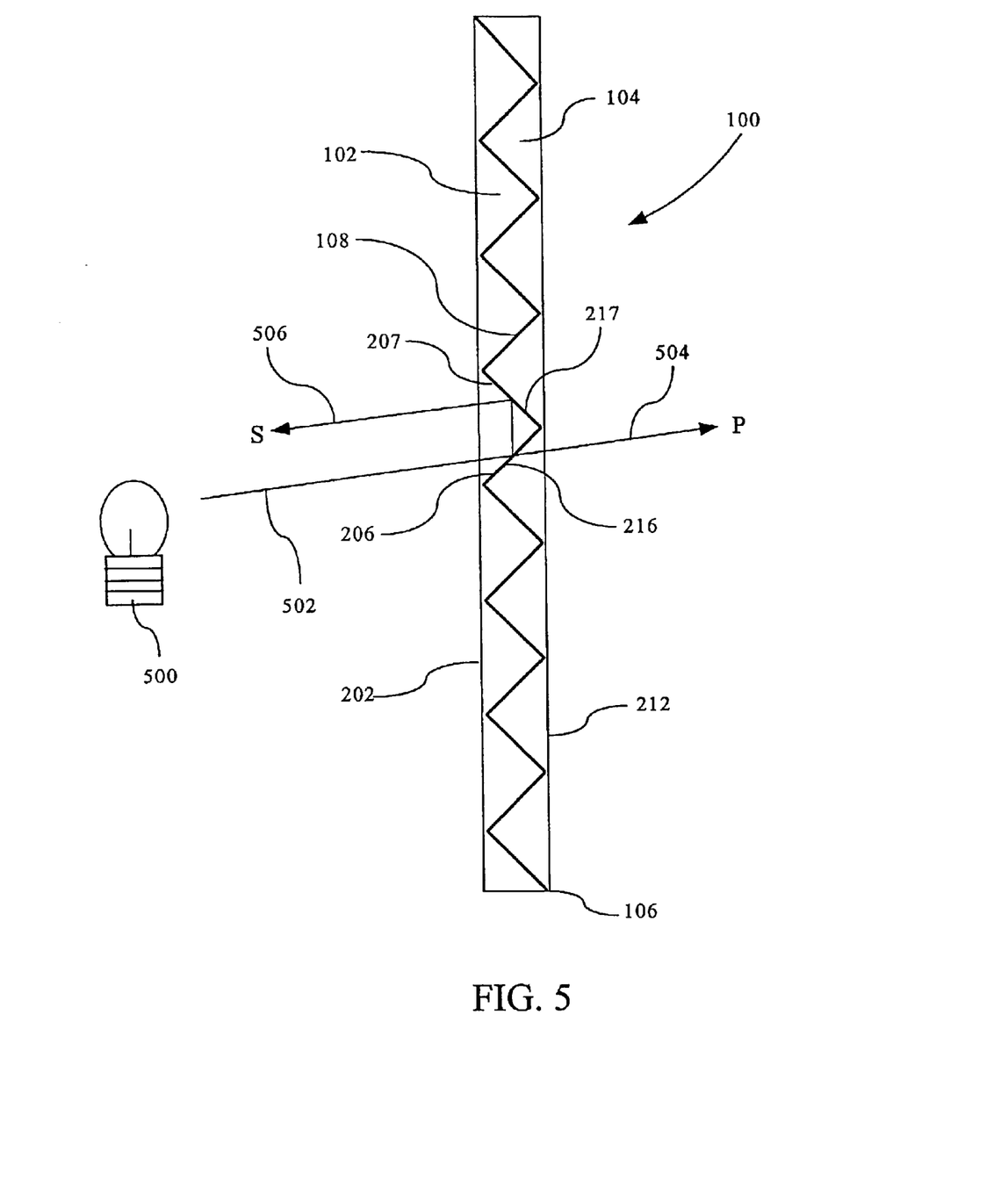
FIG. 5 is a side view illustrating the operation of a reflecting light polarizer in accordance with the present invention.

Operation of the reflecting light polarizer is shown in FIG. 5 for exemplary purposes. Polarizing coatings operate most efficiently when the angle of incidence of a light ray is greater than 0 degrees from normal with respect to a plane of polarizing coating. Hence, the present invention improves polarizing efficiency of the polarizing coating. A typical light ray 502 from a light source 500 can enter the mating junction 106 wherein the polarizing coating 108 is disposed, for example between first planar segments 206 and third planar segments 216. Because the junction between the first and third planar segments 206, 216 can have an angle of approximately 45 degrees with respect to the first and second planar surfaces 202, 212, the light ray 502 can enter the mating junction with an incident angle greater than 0 degrees from normal with respect to the mating junction 106. The polarizing coating therefore efficiently passes a first light polarization 504 and reflects a second light polarization 506. For example, P polarization of light can pass through the polarizing beam splitter while the S polarization of the light is reflected. The S polarization can be reflected a first instance by the polarizing coating 108 disposed between first planar segments 206 and third planar segments 216. The S polarization then can be reflected a second instance by the polarizing coating 108 disposed between second planar segments 207 and fourth planar segments 217, reflecting the S polarization back to the light source 500. The junction between the second and fourth planar segments 207, 217 also can have an angle of approximately 45 degrees with respect to the first and second planar surfaces 202, 212, hence the second instance of reflection also can be at an incident angle greater than 0 degrees from normal with respect to the mating junction 106.

Figure 6:
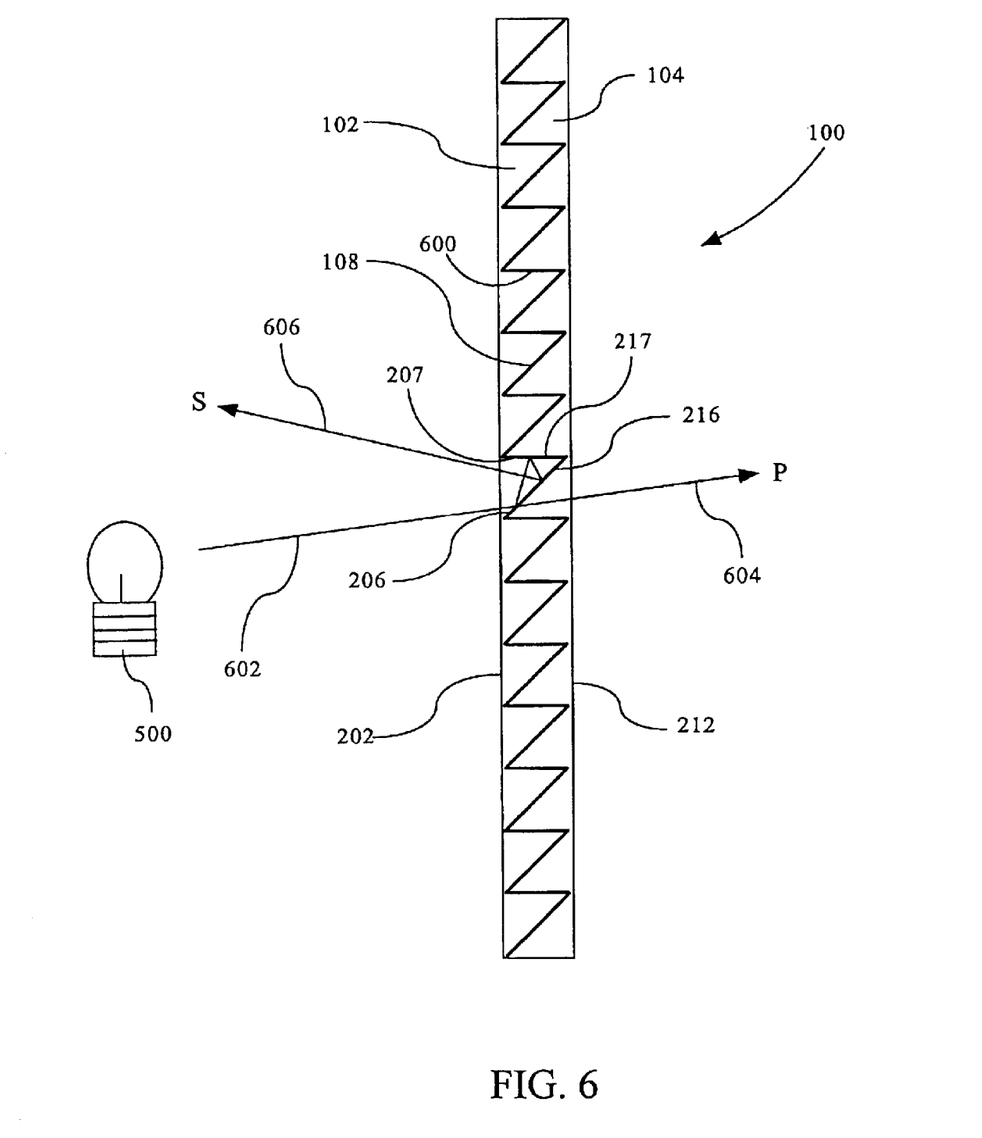
FIG. 6 is a side view illustrating the operation of an alternate embodiment of a reflecting light polarizer in accordance with the present invention.

An alternate embodiment of the polarizing beam splitter 100 is shown in FIG. 6. The plurality of first planar segments 206 and a plurality of third planar segments 216 can be congruently disposed at an angle of 45 degrees with reference to first and second planar surfaces 202, 212. A plurality of second planar segments 207 and a plurality of fourth planar segments 217 can be congruently disposed at an angle perpendicular to the first and second planar surfaces 202, 212. Polarizing coating 108 can be disposed between the pluralities of first planar segments 206 and third planar segments 216 and a mirror coating can be disposed between the pluralities of second planar segments 207 and fourth planar segments 217.

In operation, light ray 602 from a light source 500 can enter the mating junction 106 between first planar segments 206 and third planar segments 216 wherein the polarizing coating 108 is disposed. Again, the light ray 602 can enter the mating junction with an incident angle greater than 0 degrees from normal with respect to the mating junction 106, which passes a first light polarization 604 and reflects a second light polarization 606. For example, P polarization of the light ray 602 can pass through the polarizing beam splitter while the S polarization of the light is reflected. The S polarization can be reflected a first instance by the polarizing coating 108 disposed between first planar segments 206 and a plurality of third planar segments 216. The S polarization then can be reflected a second instance by the mirror coating 600 disposed between second planar segments 207 and fourth planar segments 217, which reflects the S polarization back to the polarizing coating 108 disposed between first planar segments 206 and third planar segments 216, which finally reflects the S polarization a third instance away from the polarizing beam splitter 100.

It should be understood that the examples and embodiments described herein are for illustrative purposes only and that various modifications or changes in light thereof can be suggested by persons skilled in the art and are to be included within the spirit and purview of this application. The invention can take many other specific forms without departing from the spirit or essential attributes thereof for an indication of the scope of the invention.

What is claimed is:

1. A reflecting light polarizer having improved polarizing efficiency, comprising:
   a first non-linear mating surface;
   a second non-linear mating surface;
   a polarizing coating disposed between the first non-linear mating surface and the second non-linear mating surface; and
   at least one clamping device securing together the first non-linear mating surface and the second non-linear mating surface;
   wherein a first light polarization is transmitted through the reflecting light polarizer and a second light polarization is reflected by the reflecting light polarizer.

2. A reflecting light polarizer according to claim 1, further comprising a glue disposed between the first non-linear mating surface and the second non-linear mating surface.

3. A reflecting light polarizer according to claim 1, wherein a cross section of at least one of the first and second non-linear mating surfaces is saw tooth shaped.

4. A reflecting light polarizer according to claim 1, wherein at least one of the first and second non-linear mating surfaces comprises at least one planar segment.

5. A reflecting light polarizer according to claim 1, wherein the first and second mating surfaces have substantially continuous contact with the polarizing coating disposed between the first and second mating surfaces.

6. A reflecting light polarizer according to claim 1, wherein at least one of the first and second non-linear mating surfaces is a glass surface.

7. A reflecting light polarizer according to claim 1, wherein at least one of the first and second non-linear mating surfaces is a plastic surface.

8. A reflecting light polarizer according to claim 1, wherein at least one of the first and second non-linear mating surfaces is a crystalline surface.

9. A reflecting light polarizer according to claim 1, wherein at least one of the first and second polarizations of light is an S polarization.

10. A reflecting light polarizer according to claim 1, wherein at least one of the first and second polarizations of light is a P polarization.

11. A reflecting light polarizer having improved polarizing efficiency, comprising:
    a first mating surface having a saw tooth shaped cross section;
    a second mating surface having a saw tooth shaped cross section;
    a polarizing coating disposed between the first mating surface and the second mating surface; and
    at least one clamping device securing together the first mating surface and the second matins surface;
    wherein a first light polarization is transmitted through the reflecting light polarizer and a second light polarization is reflected by the reflecting light polarizer.

12. A reflecting light polarizer according to claim 11, further comprising a glue disposed between the first mating surface and the second mating surface.

13. A reflecting light polarizer having improved polarizing efficiency, comprising:
   a first mating surface comprising a plurality of first planar segments and a plurality of second planar segments, the second planar segments being interposed between adjacent ones of the first planar segments;
   a second mating surface comprising a plurality of third planar segments and a plurality of fourth planar segments, the fourth planar segments being interposed between adjacent ones of the third planar segments;
   a polarizing coating disposed between the first planar segments and the third planar segments;
   a mirror coating disposed between the second planar segments and the fourth planar and
   at least one clamping device securing together the first mating surface and the second mating surface;
   wherein a first light polarization is transmitted through the reflecting light polarizer and a second light polarization is reflected by the reflecting light polarizer.

14. A reflecting light polarizer according to claim 13, wherein the plurality of first planar segments and the plurality of third planar segments are disposed approximately 45 degrees with reference to the plurality of second planar segments and the plurality of fourth planar segments.

15. A method of manufacturing a reflecting light polarizer having improved polarizing efficiency, comprising the steps of:
   (a) depositing a first polarizing coating on at least one mating surface of a plurality of plates;
   (b) securing together the plurality of plates with the first polarizing coating disposed between the mating surfaces of adjacent plates;
   (c) cutting the secured plurality of plates along at least one first cross section to form a plurality of plate sections, each of the plate sections having at least one cross sectional surface;
   (d) applying a second polarizing coating to a plurality of the cross sectional surfaces;
   (e) securing together the plurality of plate sections, wherein the cross sectional surfaces of adjacent plate sections are mated together and the polarizing coating is disposed between the cross sectional surfaces being mated; and
   (f) cutting the plurality of plate sections along at least one second cross section.

16. The method of claim 15, wherein the first polarizing coating and the second polarizing coating comprise a similar polarizing material.

17. The method of claim 15, wherein the plurality of plates are secured together with glue.

18. The method of claim 15, wherein the plurality of plate sections re-is-secured together with glue.

19. The method of claim 15, wherein the first cross section is substantially perpendicular to the at least one mating surface.

20. The method of claim 19, wherein the second cross section is disposed approximately 45 degrees with reference to the first cross section.

21. A method of manufacturing a reflecting light polarizer having improved polarizing efficiency, comprising the steps of:
   (a) molding a first plate having a first mating surface;
   (b) molding a second plate having a second mating surface;
   (c) depositing a polarizing coating to at least one of the first mating surface and the second mating surface; and
   (d) securing the first mating surface to the second mating surface with at least one clamping device.

22. A reflecting light polarizer made according to the method of claim 21, comprising a glue disposed between the first mating surface and the second mating surface.

23. A method of manufacturing a reflecting light polarizer having improved polarizing efficiency, comprising the steps of:
   (a) extruding a first plate having a first mating surface;
   (b) extruding a second plate having a second mating surface;
   (c) depositing a polarizing coating to at least one of the first mating surface and the second mating surface; and
   (d) securing the first mating surface to the second mating surface with at least one clamping device.

24. A reflecting light polarizer made according to the method of claim 23, comprising a glue disposed between the first mating surface and the second mating surface.

* * * * *